(12) United States Patent
Allison et al.

(10) Patent No.: US 7,793,034 B2
(45) Date of Patent: Sep. 7, 2010

(54) MEMORY CONTROLLER AND METHOD FOR MULTI-PATH ADDRESS TRANSLATION IN NON-UNIFORM MEMORY CONFIGURATIONS

(75) Inventors: Brian D. Allison, Rochester, MN (US); Joseph A. Kirscht, Rochester, MN (US); Elizabeth A. McGlone, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 480 days.

(21) Appl. No.: 11/934,974

(22) Filed: Nov. 5, 2007

(65) Prior Publication Data

US 2009/0119478 A1 May 7, 2009

(51) Int. Cl.
*G06F 12/00* (2006.01)

(52) U.S. Cl. .......................... 711/5; 711/201; 711/202; 711/217

(58) Field of Classification Search ........................ None
See application file for complete search history.

(56) References Cited

U.S. PATENT DOCUMENTS

| 5,530,934 | A | 6/1996 | Hilton |
| 5,935,232 | A | 8/1999 | Lambrecht et al. |
| 6,199,150 | B1 | 3/2001 | Yoshikawa |
| 6,260,127 | B1 * | 7/2001 | Olarig et al. ................. 711/167 |
| 6,530,007 | B2 * | 3/2003 | Olarig et al. ................. 711/167 |
| 6,636,935 | B1 * | 10/2003 | Ware et al. ...................... 711/5 |
| 6,769,050 | B1 * | 7/2004 | Ware et al. ................... 711/154 |
| 6,785,782 | B1 * | 8/2004 | Ware et al. ................... 711/149 |
| 6,826,657 | B1 * | 11/2004 | Ware et al. ................... 711/149 |
| 6,961,831 | B2 * | 11/2005 | Ware et al. ................... 711/154 |
| 7,073,035 | B2 * | 7/2006 | Ware et al. ................... 711/154 |
| 2002/0002662 | A1 * | 1/2002 | Olarig et al. ................. 711/167 |
| 2004/0230743 | A1 * | 11/2004 | Ware et al. ................... 711/115 |
| 2005/0174825 | A1 * | 8/2005 | Ware et al. ..................... 365/52 |

* cited by examiner

*Primary Examiner*—Kevin Verbrugge
(74) *Attorney, Agent, or Firm*—Bockhop & Associates LLC

(57) ABSTRACT

In a method of translating a physical memory address to a device address in a device memory space, a fast address translate of the physical memory address, adapted to translate addresses in uniformly configured device memory space, is performed thereby generating a first translated address. A full address translate of the physical memory address, adapted to translate addresses in non-uniformly configured device memory space, is also performed thereby generating a second translated address. Boundaries of a uniform portion of the device memory space are identified, to which the physical memory address is compared to determine if the physical memory address is in the uniform portion of the device memory space. When the physical memory address is in the uniform portion, the first translated address is selected as the device address. Otherwise, the second translated address is selected.

20 Claims, 3 Drawing Sheets

FIG. 1A

| | Port 0 | Port 1 | Port 2 | Port 3 |
|---|---|---|---|---|
| PHYSICAL RANK 7 | *EMPTY* | *EMPTY* | *EMPTY* | *EMPTY* |
| PHYSICAL RANK 6 | *EMPTY* | *EMPTY* | *EMPTY* | *EMPTY* |
| PHYSICAL RANK 5 | *EMPTY* | *EMPTY* | *EMPTY* | *EMPTY* |
| PHYSICAL RANK 4 | *EMPTY* | *EMPTY* | *EMPTY* | *EMPTY* |
| PHYSICAL RANK 3 | 2048Mbx4 | 2048Mbx4 | 2048Mbx4 | 2048Mbx4 |
| PHYSICAL RANK 2 | 2048Mbx4 | 2048Mbx4 | 2048Mbx4 | 2048Mbx4 |
| PHYSICAL RANK 1 | 2048Mbx4 | 2048Mbx4 | 2048Mbx4 | 2048Mbx4 |
| PHYSICAL RANK 0 | 2048Mbx4 | 2048Mbx4 | 2048Mbx4 | 2048Mbx4 |

FIG. 1B

| | Port 0 | Port 1 | Port 2 | Port 3 |
|---|---|---|---|---|
| PHYSICAL RANK 7 | *EMPTY* | *EMPTY* | *EMPTY* | *EMPTY* |
| PHYSICAL RANK 6 | *EMPTY* | *EMPTY* | *EMPTY* | 512Mbx4 |
| PHYSICAL RANK 5 | *EMPTY* | *EMPTY* | *EMPTY* | *EMPTY* |
| PHYSICAL RANK 4 | 512Mbx4 | *EMPTY* | *EMPTY* | 512Mbx4 |
| PHYSICAL RANK 3 | 2048Mbx4 | *EMPTY* | *EMPTY* | *EMPTY* |
| PHYSICAL RANK 2 | 512Mbx4 | 2048Mbx4 | *EMPTY* | 1024Mbx4 |
| PHYSICAL RANK 1 | 2048Mbx4 | *EMPTY* | *EMPTY* | *EMPTY* |
| PHYSICAL RANK 0 | 1024Mbx4 | *EMPTY* | *EMPTY* | 2048Mbx4 |

FIG. 1C

| | Port 0 | Port 1 | Port 2 | Port 3 |
|---|---|---|---|---|
| PHYSICAL RANK 7 | *EMPTY* | *EMPTY* | *EMPTY* | *EMPTY* |
| PHYSICAL RANK 6 | *EMPTY* | *EMPTY* | *EMPTY* | *EMPTY* |
| PHYSICAL RANK 5 | 1024Mbx4 | *EMPTY* | *EMPTY* | *EMPTY* |
| PHYSICAL RANK 4 | 512Mbx4 | 1024Mbx4 | *EMPTY* | *EMPTY* |
| PHYSICAL RANK 3 | 2048Mbx4 | 2048Mbx4 | 2048Mbx4 | 2048Mbx4 |
| PHYSICAL RANK 2 | 2048Mbx4 | 2048Mbx4 | 2048Mbx4 | 2048Mbx4 |
| PHYSICAL RANK 1 | 2048Mbx4 | 2048Mbx4 | 2048Mbx4 | 2048Mbx4 |
| PHYSICAL RANK 0 | 2048Mbx4 | 2048Mbx4 | 2048Mbx4 | 2048Mbx4 |

MEMORY CONTROLLER AND METHOD FOR MULTI-PATH ADDRESS TRANSLATION IN NON-UNIFORM MEMORY CONFIGURATIONS

BACKGROUND OF THE INVENTION

1. Field of the Invention

The present invention relates to digital memory management systems and, more specifically, to a system that manages partially uniform memory configurations in a memory space.

2. Description of the Prior Art

Most computer systems employ a memory space for the storage of information. Part of the memory space will typically include an array of dynamic random access memory (DRAM) devices that are organized into one of several ports. Typically, each port will include several ranks into which each DRAM device is placed. One exemplary system includes four memory ports, with 16 memory ranks per memory port, into which any one of six different DRAM technologies may be plugged. In such a system, there millions of possible plug configurations.

To realize the best performance, it is best to interleave as much of the memory as possible. For uniform plug configurations, such as a two-port or four-port configurations with matched DRAM technology and matched plug order, the same address map is used for all accesses. In such configurations, address translation can be performed quite easily and quickly, thereby resulting in minimum latency. Non-uniform plug configurations have either non-matched DRAM technology or non-matching plug order across the populated ports. In non-uniform configurations, translating an address requires first comparing the address against various boundaries to determine which "interleave region" that the address belongs to. Once the interleave region is determined, address translation logic must adjust the address to fit the map for that region. The adjusted address is then compared against the base offsets for each memory rank, extracting the DRAM technology corresponding to the matching base offset. Using the extracted DRAM technology, the adjusted address is then applied to the corresponding map for that technology to arrive ultimately at the actual DRAM address. This is referred to as a "full translation."

Existing systems allow use of a "homogeneous technology mode" (HT mode), when the plug configuration is a matched 1-, 2-, or 4-port configuration with all DRAM technologies matching and all ranks populated contiguously from 0 to n. All other cases require taking a full address translation path (i.e., employing a non-HT mode).

There are many non-uniform configurations that have a portion of the memory that is uniform. These often result when the user adds a memory device thinking that the added memory will improve performance. In this situation, the user may not realize that by making a portion of the configuration non-uniform, every memory access will require a full translation, which ultimately degrades system performance.

Therefore, there is a need for a system that employs fast address translation for addresses within a uniform portion of a non-uniform memory space.

SUMMARY OF THE INVENTION

The disadvantages of the prior art are overcome by the present invention which, in one aspect, is a method of translating a physical memory address to a device address in a device address space. A fast address translate of the physical memory address is performed, thereby generating a first translated address. The fast address translate is adapted to translate addresses in uniformly configured device address space. A full address translate of the physical memory address is performed, thereby generating a second translated address. The full address translate is adapted to translate addresses in non-uniformly configured device address space. Boundaries of a uniform portion of the device address space are identified. The physical memory address is compared to the boundaries of the uniform portion of the device address space to determine if the physical memory address is in the uniform portion of the device address space. The first translated address is selected as the device address when the physical memory address is in the uniform portion of the device address space and when at least one of the following conditions has been met: the first translated address was selected in an immediately preceding cycle or no new translation was commenced in the immediately preceding cycle. The second translated address is selected as the device address when the first translated address is not selected.

In another aspect, the invention is a digital memory system in which a device memory space includes a plurality of memory ports, with each port including a plurality of ranks. A plurality of memory devices are each coupled to the digital memory system in a selected one of the plurality of ranks. A uniform boundary recognition circuit determines a boundary of a uniform portion of the plurality of memory ports in which the plurality of memory devices is distributed uniformly. A boundary comparison circuit is configured to generate a path select signal so that the path select signal has a first value when the physical memory address corresponds to a uniform portion of the device address space and so that the path select signal has a different second value when the physical memory address corresponds to a non-uniform portion of the device address space. A first translate circuit, responsive to the physical memory address, is configured to translate the physical memory address into the device address in a first period of time when the physical memory address corresponds to the uniform portion of the device address space. A second translate circuit, responsive to the physical memory address, is configured to translate the physical memory address into the device address in a second period of time, longer than the first period of time, when the physical memory address corresponds to the non-uniform portion of the device address space. A selector, responsive to the path select signal, is configured to select the device address from the first translate circuit when the path select signal has the first value and when at least one of the following conditions has been met: the device address from the first translate circuit was selected in an immediately preceding cycle or no new translation was commenced in the immediately preceding cycle. The selector is also configured to select the device address from the second translate circuit when the device address from the first translate circuit is not selected.

In yet another aspect, the invention is an apparatus for translating a physical memory address to a device address in a device address space. A boundary comparison circuit is configured to generate a path select signal so that the path select signal has a first value when the physical memory address corresponds to a uniform portion of the device address space and so that the path select signal has a different second value when the physical memory address corresponds to a non-uniform portion of the device address space. A first translate circuit, responsive to the physical memory address, is configured to translate the physical memory address into the device address in a first period of time when the physical memory address corresponds to the uniform portion of the device address space. A second translate circuit, responsive to the physical memory address, is configured to translate the physical memory address into the device address in a second period of time, longer than the first period of time, when the physical memory address corresponds to the non-uniform portion of the device address space. A selector, responsive to the path select signal, is configured to select the device address from the first translate circuit when the path select signal has the first value and to select the device address from the second translate circuit when the path select signal has the second value.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIGS. 1A-1C are memory space diagrams showing several different memory configurations that are manageable with the disclosed method.

DETAILED DESCRIPTION OF THE INVENTION

Figure 2:
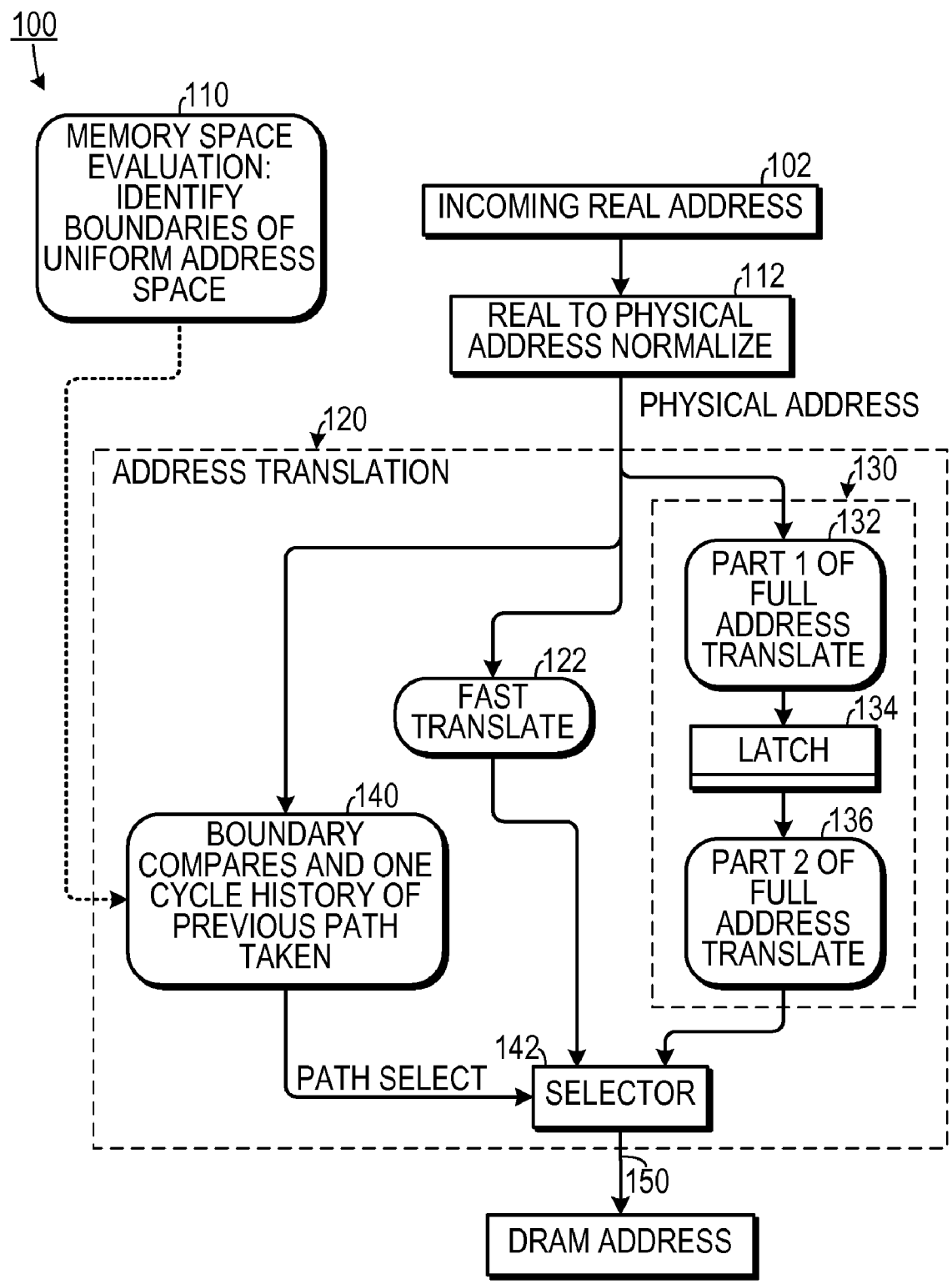
FIG. 2 is a block diagram showing one representative embodiment.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIGS. 1A-1C, many permutations of memory configurations are possible in a given memory space. In the examples shown, the memory space (which could include, for example, a plurality of DRAM modules) includes a plurality of ports (ports 0-3), each of which includes a plurality of physical ranks (ranks 0-7). A fully uniform device memory space 10 is shown in FIG. 1A, in which ranks 0-3 in each port are each configured with the same type and amount of memory (2048 Mb×4), with the remaining ranks being empty. A completely non-uniform device memory space 20 is shown in FIG. 1B, in which no one rank has the same memory configuration across each of the ports.

A partially uniform device memory space 30 is shown in FIG. 1C. In this memory space 30, ranks 0-3 have the same memory configuration across each port, but the memory configuration of rank 4 changes from port to port. Therefore, ranks 0-3 form a uniform portion of the device memory space 30, rank 4 forms a non-uniform portion of the device memory space 30, and ranks 5-7 are an empty portion of the device memory space 30. Accessing addresses in ranks 0-3 is relatively straightforward and requires only a single address map because each port is in a four-way interleave with the other three ports. Typically, an access to a uniform location can be completed in a single memory cycle. Accessing the addresses in ranks 4 and 5, on the other hand, requires a more complex process. In such a process, the system must compare each region to determine which rank an address belongs in and then determine which of a plurality of stored maps (one for each possible memory configuration) applies. Then, the address is mapped to the appropriate location. Typically, such an access to a non-uniform location requires more than one memory cycle.

As shown in FIG. 2, in one system effecting memory access 100, the system initially evaluates its memory configuration 110 to determine the boundaries of the uniform portion of its address space (if any). Each time a real address is accessed 102, the address is initially normalized 112 so as to correspond to the physical address space. The resulting physical address is then fed into an address translation block 120 (which could be effected in hardware, firmware, software, or a combination thereof), which performs a "fast" address translate 122 (which is a relatively low latency path) and a "full" address translate 130 (which is a relatively high latency path). The full address translate 130 involves a first portion 132, storage of the intermediate results of the first portion 132 in a latch 134 and a second portion 136 that operates on the contents of the latch 134. (More complex systems might employ more than two portions in the full translate and more than one latch.)

A boundary compare unit 140 compares the address to the boundaries of a uniform poration of the memory space. The boundary compare unit 140 also determines if the immediately preceding cycle employed a fast translate or a full translate. If the address is within the uniform zone and if the immediately previous cycle employed a fast translate (or if no address translate occurred during the previous cycle) then the boundary compare unit 140 generates a path select signal having a first value. Otherwise, the path select signal will have a second value, different from the first value. A selector 142 will then select, as the translated address 150, the results of the fast translate 122 if the path select signal has the first value and select the results of the full translate if the path select signal has the second value. To determine if a fast translate was executed in a previous cycle, the system would maintain a history of previously-executed memory cycles (e.g., using one or more registers). The number of cycles of history that would be maintained would be equal to the difference between the number of cycles consumed in a full address translate and the number of cycles consumed in a fast address translate.

Figure 3:
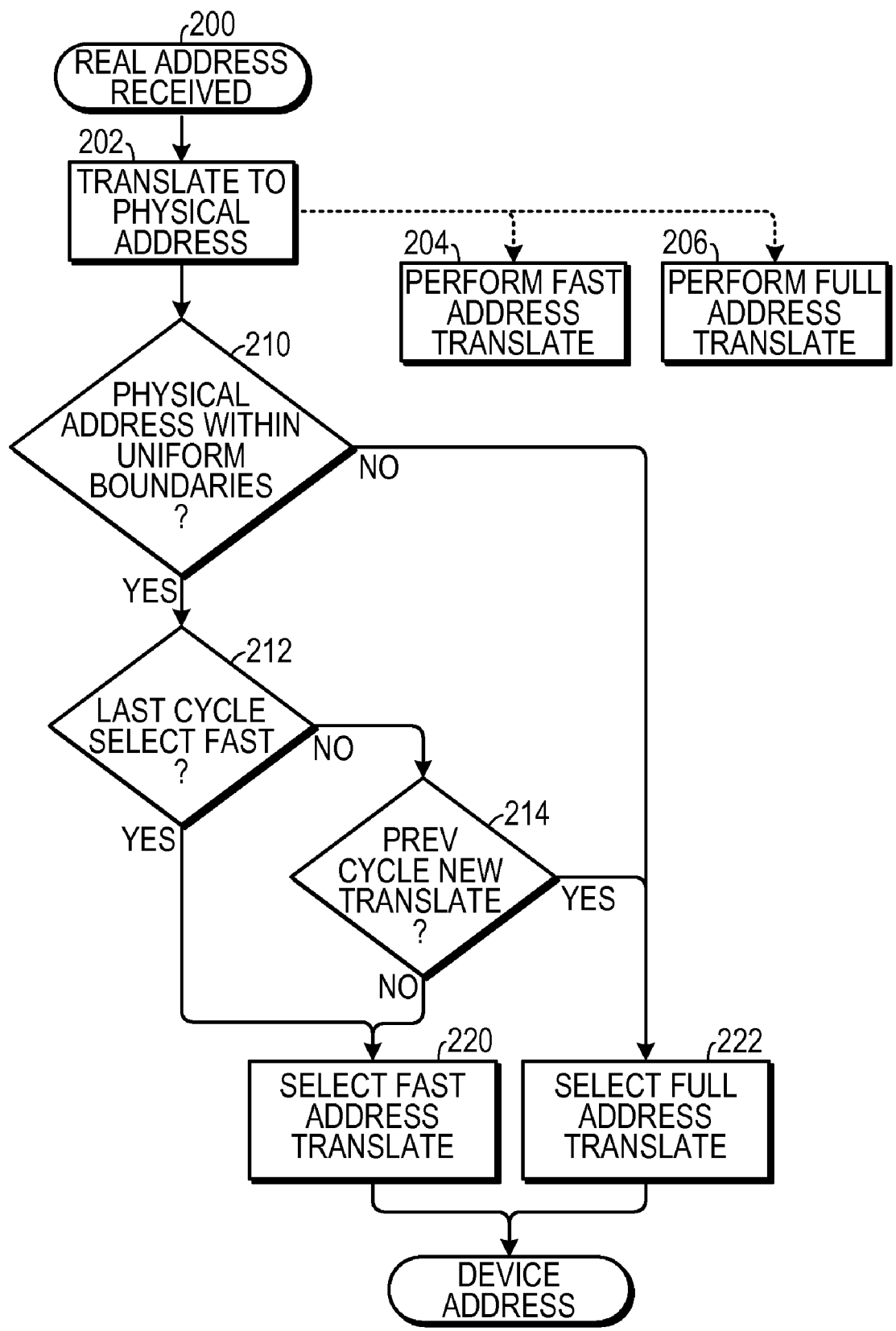
FIG. 3 is a flow diagram demonstrating a method of executing a translation from a real address to a device address.

One exemplary method for translating addresses is shown in FIG. 3. When a real address is received 200, it is initially translated 202 to a physical address and then both a fast address translate 204 and a full address translate 206 are performed.

The system determines 210 if the physical address is within the boundaries of the uniform poration and, if not, the system selects 222 the results of the full address translate as the device address. If the address is within the boundaries of the uniform portion, then the system determines 212 if the results of the fast address translate were selected in the previous cycle and, if they were, the system selects 220 the results of the fast address translate as the device address. If the fast address translate results were not selected in the previous cycle, then the system determines 214 if the system translated any address during the previous cycle. If not, then the results of the fast address translate are selected 220; otherwise, the results of the full address translate are selected 222.

Thus, the memory configuration is evaluated to determine if there are uniform portions of the memory space. If the memory is configured at the bottom of the address space and has matched technology (e.g., matched DRAM technology) and plug order, then that region of the memory is uniform. Incoming addresses are compared to the boundary between the uniform and non-uniform regions. If they are found to be in the uniform region, then the low latency path is employed. Otherwise, if they are found to be in the non-uniform region, the full address translation path is taken. If an address to the uniform region it translated in a cycle that immediately follows an access to the non-uniform region, it will also take the full address translation path to preserve ordering. When the next gap occurs in the command stream, accesses to the uniform memory region may resume taking the low latency path.

To illustrate an advantage of the present invention, consider a simple example in which the user has populated the system with four ports of memory, in which 2048 Mb×4 DRAM technology is plugged in ranks 0,1,2, & 3 in each port and in which an additional 512 Mb×4 DRAM technology plugged in rank 4 of port 0. In this example, the user might have increased the memory capacity by adding the additional 512 Mb×4 DRAM in rank 4 of port 0, assuming more memory will result in better performance. However, by adding the additional memory the user has created a non-uniform memory configuration. With prior art systems solution, the address translation latency would be increased for all memory accesses. With the present invention applied to this example, the system would benefit from the reduced latency associated with the fast translate path for up to 64 out of each 65 of all of the memory accesses. This can result in a significant performance advantage. Even with a system using a relatively small amount of memory in a uniform region, a performance enhancement can be realized.

The present invention allows the path to be selected dynamically based upon which translation logic will be used. To modify an existing system, the static path selection would simply have to be replaced by a dynamic path selection that would perform a few boundary comparisons of the incoming physical address to determine which region the command is destined. A one cycle history would also be required to track whether or not there was a valid command processed on the previous cycle and, if so, which path it took. One embodiment can even support multiple uniform memory regions with multiple boundaries with the non-uniform memory region on top, if such a region exists.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method of translating a physical memory address to a device address in a device address space, comprising the actions of:
   a. performing a fast address translate of the physical memory address, thereby generating a first translated address, the fast address translate being adapted to translate addresses in uniformly configured device address space;
   b. performing a full address translate of the physical memory address, thereby generating a second translated address, the full address translate being adapted to translate addresses in non-uniformly configured device address space;
   c. identifying boundaries of a uniform portion of the device address space;
   d. comparing the physical memory address to the boundaries of the uniform portion of the device address space to determine if the physical memory address is in the uniform portion of the device address space;
   e. selecting the first translated address as the device address when the physical memory address is in the uniform portion of the device address space and when at least one of the following conditions has been met: the first translated address was selected in an immediately preceding cycle or no new translation was commenced in the immediately preceding cycle; and
   f. selecting the second translated address as the device address when the first translated address is not selected.

2. The method of claim 1, wherein the action of performing a full address translate comprises the action of latching, at least one time, an intermediate result prior to generating the second translated address.

3. The method of claim 1, wherein the device address space comprises a plurality of ports and wherein each port comprises a plurality of ranks.

4. The apparatus of claim 3, wherein the uniform portion of the device address space comprises a portion of the address space in which every corresponding rank in each port is configured with memory devices of identical capacity.

5. The method of claim 1, wherein the fast address translate corresponds to a low latency path.

6. The method of claim 5, wherein the full address translate corresponds to a path that has a higher latency than the low latency path.

7. A digital memory system, comprising:
   a. a device memory space that includes a plurality of memory ports, each port including a plurality of ranks;
   b. a plurality of memory devices each coupled to the digital memory system in a selected one of the plurality of ranks;
   c. a uniform boundary recognition circuit that determines a boundary of a uniform portion of the plurality of memory ports in which the plurality of memory devices is distributed uniformly;
   d. a boundary comparison circuit that is configured to generate a path select signal so that the path select signal has a first value when the physical memory address corresponds to a uniform portion of the device address space and so that the path select signal has a different second value when the physical memory address corresponds to a non-uniform portion of the device address space;
   e. a first translate circuit, responsive to the physical memory address, configured to translate the physical memory address into the device address in a first period of time when the physical memory address corresponds to the uniform portion of the device address space;
   f. a second translate circuit, responsive to the physical memory address, configured to translate the physical memory address into the device address in a second period of time, longer than the first period of time, when the physical memory address corresponds to the non-uniform portion of the device address space; and
   g. a selector, responsive to the path select signal, the selector is configured to:
      i. select the device address from the first translate circuit when the path select signal has the first value and when at least one of the following conditions has been met: the device address from the first translate circuit was selected in an immediately preceding cycle or no new translation was commenced in the immediately preceding cycle; and ii. to select the device address from the second translate circuit when the device address from the first translate circuit is not selected.

8. The system of claim 7, wherein each of the memory devices comprises a dynamic random address memory module.

9. The system of claim 7, wherein the uniform portion comprises a portion of the device address space in which every corresponding rank in each port is configured with memory devices of identical capacity.

10. The method of claim 7, wherein the first translate circuit corresponds to a low latency path.

11. The method of claim 10, wherein the low latency path corresponds to a fast translate.

12. The method of claim 7, wherein the second translate circuit corresponds to a higher latency path that has a higher latency than the low latency path.

13. The method of claim 10, wherein the higher latency path corresponds to a full translate.

14. An apparatus for translating a physical memory address to a device address in a device address space, comprising:
  a. a boundary comparison circuit that is configured to generate a path select signal so that the path select signal has a first value when the physical memory address corresponds to a uniform portion of the device address space and so that the path select signal has a different second value when the physical memory address corresponds to a non-uniform portion of the device address space;
  b. a first translate circuit, responsive to the physical memory address, configured to translate the physical memory address into the device address in a first period of time when the physical memory address corresponds to the uniform portion of the device address space;
  c. a second translate circuit, responsive to the physical memory address, configured to translate the physical memory address into the device address in a second period of time, longer than the first period of time, when the physical memory address corresponds to the non-uniform portion of the device address space; and
  d. a selector, responsive to the path select signal, that is configured to select the device address from the first translate circuit when the path select signal has the first value and to select the device address from the second translate circuit when the path select signal has the second value.

15. The apparatus of claim 14, wherein the device address space comprises a plurality of ports and wherein each port comprises a plurality of ranks.

16. The apparatus of claim 15, wherein the uniform portion of the device address space comprises a portion of the address space in which every corresponding rank in each port is configured with memory devices of identical capacity.

17. The method of claim 14, wherein the first translate circuit corresponds to a low latency path.

18. The method of claim 17, wherein the low latency path corresponds to a fast translate.

19. The method of claim 14, wherein the second translate circuit corresponds to a higher latency path that has a higher latency than the low latency path.

20. The method of claim 19, wherein the higher latency path corresponds to a full translate.

* * * * *